(12) United States Patent
Oag et al.

(10) Patent No.: US 10,239,266 B2
(45) Date of Patent: Mar. 26, 2019

(54) METHOD AND APPARATUS FOR MANUFACTURING CONTACT LENSES

(71) Applicant: CooperVision International Holding Company, LP, St. Michael (BB)

(72) Inventors: Robert Oag, Southampton (GB); David Robert Morsley, Eastleigh (GB); Jaroslaw W. Orlik, Southampton (GB); Gregg A. Dean

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 15/642,358

(22) Filed: Jul. 6, 2017

(65) Prior Publication Data
US 2017/0297282 A1   Oct. 19, 2017

Related U.S. Application Data

(63) Continuation of application No. PCT/GB2016/051463, filed on May 20, 2016.

(60) Provisional application No. 62/165,241, filed on May 22, 2015.

(51) Int. Cl.
*B29C 33/52* (2006.01)
*B29D 11/00* (2006.01)

(52) U.S. Cl.
CPC ........ *B29D 11/00192* (2013.01); *B29C 33/52* (2013.01); *B29D 11/0048* (2013.01); *B29K 2829/04* (2013.01); *B29K 2995/0059* (2013.01)

(58) Field of Classification Search
None
See application file for complete search history.

(56) References Cited

U.S. PATENT DOCUMENTS

| | | | |
|---|---|---|---|
| 4,182,723 A | 1/1980 | Covington | |
| 2007/0296096 A1* | 12/2007 | Bruce | B29C 33/202 264/1.36 |
| 2008/0001317 A1 | 1/2008 | Tokarski et al. | |
| 2013/0161846 A1* | 6/2013 | Goodenough | G02C 7/04 264/2.5 |

FOREIGN PATENT DOCUMENTS

| | | |
|---|---|---|
| EP | 1129842 A2 | 9/2001 |
| WO | 2012013948 A1 | 2/2012 |

OTHER PUBLICATIONS

International Search Report and Written Opinion issued in corresponding International Patent Application No. PCT/GB2016/051463 dated Sep. 14, 2016 (16 pages).

* cited by examiner

*Primary Examiner* — Lisa L Herring
(74) *Attorney, Agent, or Firm* — Kilyk & Bowersox, P.L.L.C.

(57) ABSTRACT

Apparatus and methods are described for manufacturing contact lenses employing dissolvable mold structure. The apparatus and methods involve approaches to dissolve at least portions of a mold and to separate a lens from the mold to present the lens for collection.

11 Claims, 11 Drawing Sheets

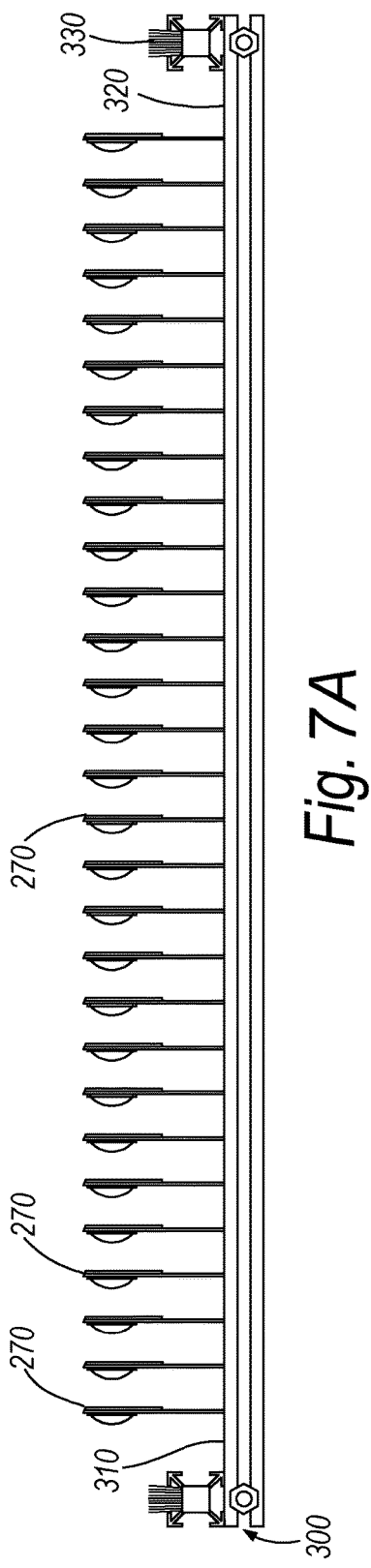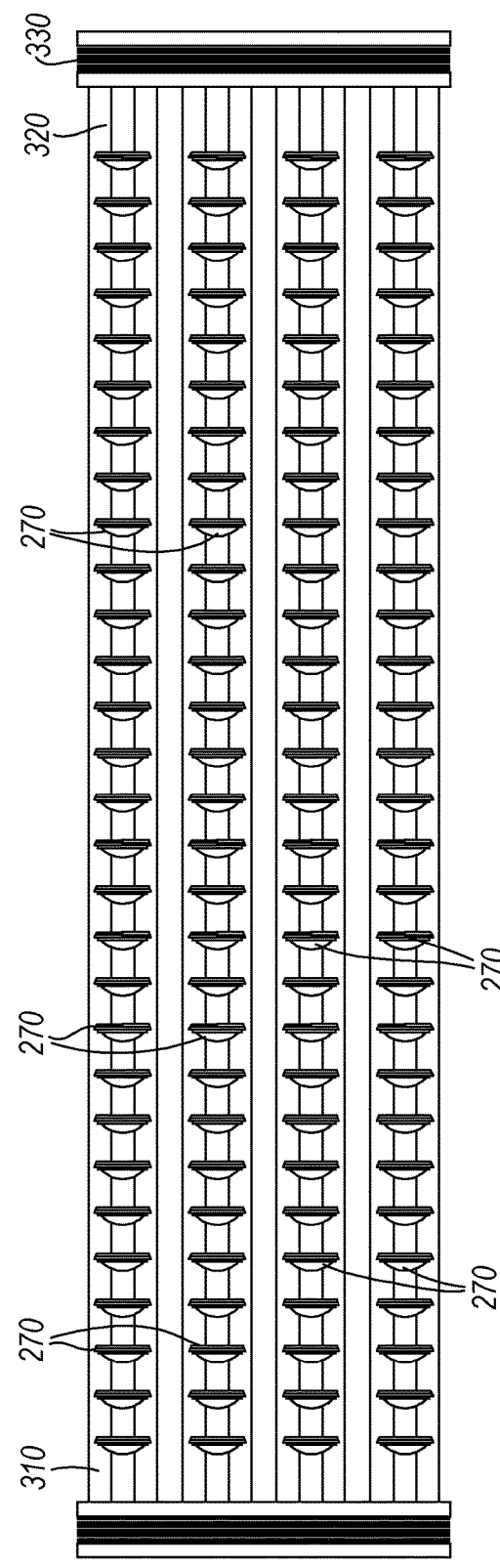
Fig. 7A
Fig. 7B

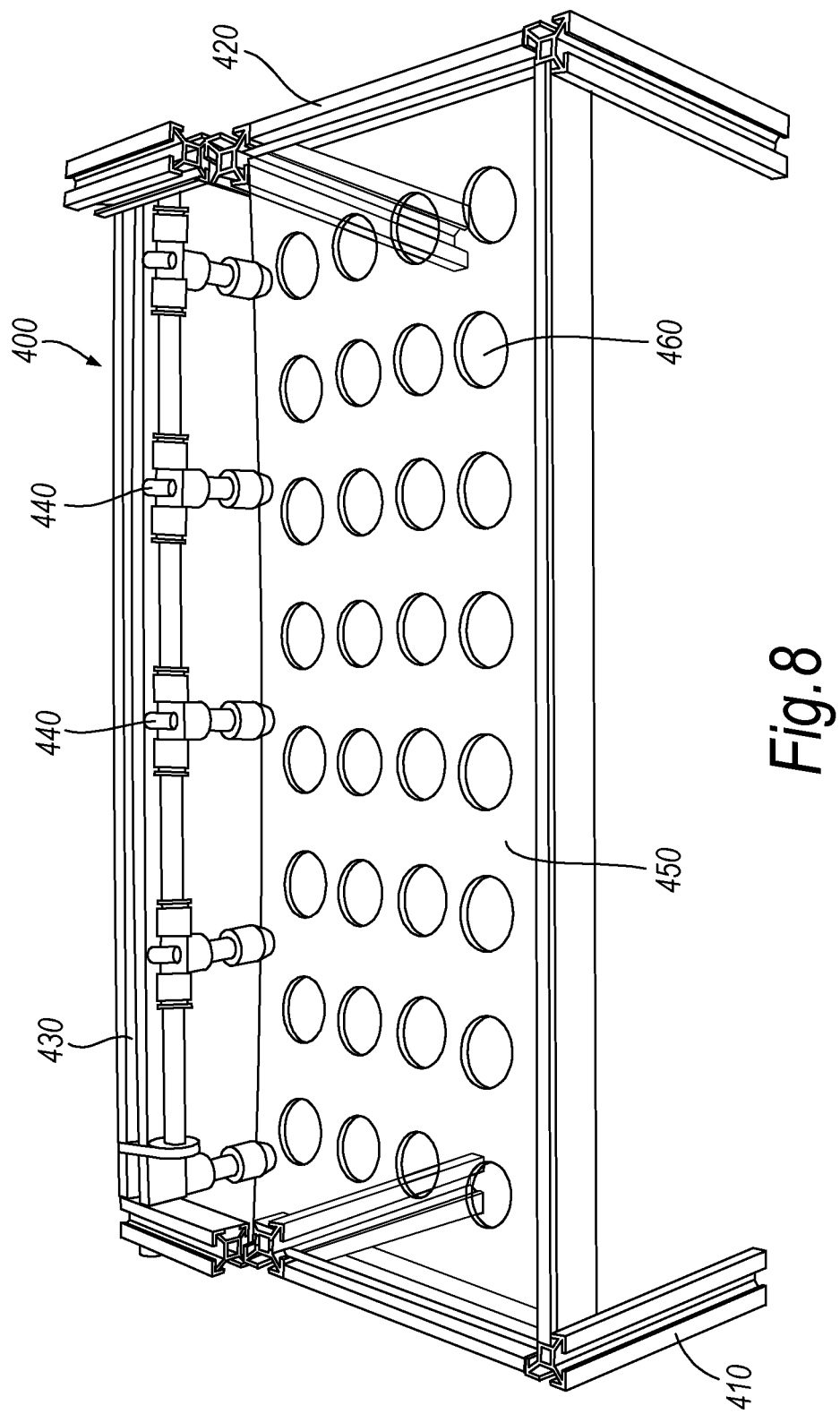

METHOD AND APPARATUS FOR MANUFACTURING CONTACT LENSES

This application is a continuation of International Patent Application No. PCT/GB2016/051463, filed May 20, 2016, which claims the benefit under 35 U.S.C. § 119(e) of prior U.S. Provisional Patent Application No. 62/165,241, filed May 22, 2015, which are incorporated in their entireties by reference herein.

FIELD

This disclosure relates to the field of contact lens manufacture. In particular, the disclosure provides a method of and apparatus for manufacturing contact lenses using pairs of mold halves wherein a lens is formed in each pair and then released by dissolving the mold halves in a solvent.

BACKGROUND

Various methods of manufacturing contact lenses are known, including spin casting, lathing (for example by diamond turning), and cast molding (for example, using injection molded mold halves). In particular, cast molding of contact lenses involves forming a pair of mold halves (i.e., a first mold half and a second mold half), placing a volume of a contact lens formulation on an optical quality surface of one of the two mold halves, and placing the two mold halves in contact with each other to form a contact lens mold assembly that has a contact lens shaped cavity containing the contact lens formulation. The contact lens mold assembly is then exposed to conditions to cause the contact lens formulation to polymerize or cure in the contact lens mold assembly. As understood in the art, the mold halves may be referred to as "mold sections" (i.e., first and second mold sections) or "mold members" (i.e., first and second mold members). In a typical method, after polymerization, the lens mold halves are separated (for example by prying them apart or punching one from another), in a process step referred to as "demolding". The polymerized contact lens formulation, now in the form of an unhydrated lens, is retained in one mold half, from which the lens is removed (for example by picking it out using a vacuum pick head or by floating it off by immersing the mold half in water or another liquid); the process step of removing the lens from the mold half is referred to as "delensing". In another method the mold halves, or at least the portions thereof that form the contact lens shaped cavity when in contact with each other, may be formed of a material that is soluble in a solvent in which the cured lens is insoluble. In such a method, the demolding and delensing may involve immersing all or part of the mold assembly in the solvent to dissolve the soluble material, thereby releasing the cured lens.

Where a lens manufacturing process employs dissolvable molds, the time to dissolve the molds can become a key to desired efficiency. Moreover, techniques to effectively delense a lens from a mold also lend themselves to desired manufacturing output.

Accordingly, there has developed a need to improve mold dissolving times in molding methods employing dissolvable molds. There has also developed a need to better separate a lens from a mold, and to best present the lens for collection.

The present disclosure addresses these and other needs.

SUMMARY

Briefly and in general terms, the present disclosure addresses apparatus and methods directed towards improving efficiency of lens manufacturing in approaches employing dissolvable molds. The present disclosure further addresses approaches to efficiently collect lenses manufactured from dissolvable molds.

A first aspect of the disclosure provides a mold member for use in a method of forming a contact lens. A cavity-defining portion of the mold member can be configured to define at least part of a cavity. The contact lens can be formed by placing and polymerizing a polymerizable contact lens precursor material in the cavity. It is to be recognized that the cavity can be formed from multiple parts, such as two halves, or the cavity can be defined by a unitary mold. The cavity-defining portion can be formed of a material that is soluble in a solvent in which the contact lens is not soluble. A support portion of the mold member extending from the cavity defining portion can be configured to be held whilst the cavity-defining portion of the mold member is immersed in the solvent. The cavity-defining portion of the mold member can further define a first part of a channel. The channel can be configured to receive an excess of said precursor material when said precursor material is placed in the cavity. The support portion of the mold member can define a second part of the channel that is in fluid communication with the first part of the channel to receive a portion of said excess precursor material.

A second aspect of the disclosure provides a method of forming a contact lens. A polymerizable contact lens precursor material can be provided in a cavity defined by at least one cavity-defining portion of at least one mold member. The cavity-defining portion can embody a material that is soluble in a solvent in which the contact lens is not soluble. The precursor material can be polymerized to form an unhydrated contact lens in the cavity. A support portion of the mold member extending from the cavity-defining portion can be held whilst the cavity-defining portion is immersed in the solvent. At least part of the soluble material of the cavity-defining portion can be dissolved. The unhydrated contact lens can thereby be released from the cavity. The contact lens can also be first hydrated then released from the mold. More of the precursor material can be provided to the cavity than is required to fill the cavity, so that there is an excess of the precursor material. The excess can pass into a channel defined by the at least one cavity-defining portion of the at least one mold member. A portion of the excess of the precursor material can pass from said first part of the channel into a second part of the channel defined by the support portion of the mold member extending from the cavity-defining portion. After the precursor material is polymerized and the soluble material of the cavity-defining portion is dissolved, the excess precursor material can form a solid that is retained by the support portion.

In other aspects, there is provided an apparatus and method for effectively delivering ultrasonic energy to dissolve a mold component. In one approach, a glass vial can be provided about a mold and retained in position by a support, and jets can be additionally or alternatively configured to increase water flow about a mold. Further, one or more individual mold holders can be configured to retain the mold vertically within a dissolving bath.

It will be appreciated that features described in relation to one aspect of the present disclosure can be incorporated into other aspects of the present disclosure. For example, an apparatus of the disclosure can incorporate any of the features described with reference to a method of the disclosure, and vice versa. Moreover, additional embodiments and aspects of the disclosure will be apparent from the following description, drawings, and claims. As can be appreciated from the foregoing and following description, each and every feature described herein, and each and every combination of two or more of such features, and each and every combination of one or more values defining a range, are included within the scope of the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described, by way of example only, with reference to the accompanying drawings.

FIGS. 7A and 7B show a rack holding a plurality of pairs of molds according to an example embodiment of the disclosure, in 7A a side view and 7B a bottom view.

FIG. 8 is a table for receiving a rack holding pairs of the molds.

DETAILED DESCRIPTION

Figure 1A:
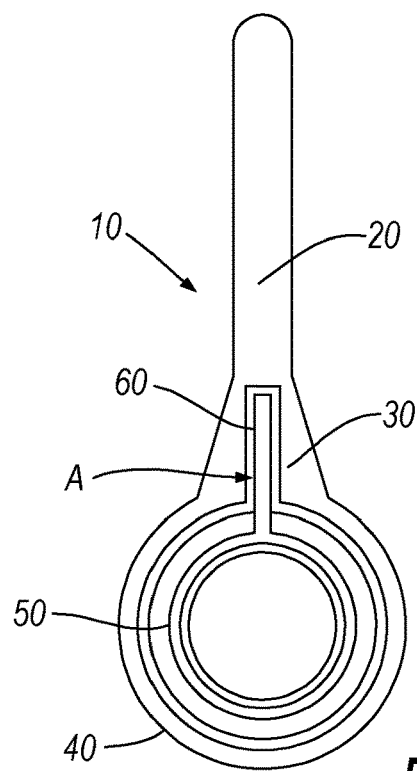
FIGS. 1A and 1B are schematic illustrations of a pair of mold members according to a first example embodiment of the disclosure, 1A before and 1B after partial immersion in a solvent.

Embodiments of the present disclosure are described herein in the context of approaches to improve mold dissolving efficiency in molding approaches employing dissolvable molds, as well as approaches to better separate a lens from a mold, and to best present the lens for collection. Although the present disclosure is exemplified in the context of a contact lens, it will be understood that the present disclosure relates to medical devices generally, or to other apparatus which involve dissolving structure and efficiencies in manufacturing.

Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will be made in detail to implementations of the present disclosure as illustrated in the accompanying drawings. The same reference indicators will be used throughout the drawings and the following detailed description to refer to the same or like parts.

As previously stated, in a first aspect, the present disclosure is directed to a mold member for use in forming a contact lens, the mold member comprising:

a cavity-defining portion configured to define at least part of a cavity in which the contact lens is to be formed by placing and polymerizing a polymerizable contact lens precursor material in the cavity, the cavity-defining portion being formed of a material that is soluble in a solvent in which the contact lens is not soluble;

a support portion configured to be held whilst the cavity-defining portion of the mold member is immersed in the solvent;

characterized in that the cavity-defining portion of the mold member further defines at least part of a channel configured to receive an excess of said precursor material when said precursor material is placed in the cavity; and the support portion of the mold member defines at least part of a channel that is in fluid communication with the channel defined at least in part by the cavity-defining portion of the mold member and that is thereby configured to receive a portion of said excess precursor material.

The cavity-defining portion can be circular or substantially circular.

The support portion can be curved and wholly or partly surround the cavity-defining portion. Alternatively, the support portion can be a straight or curved elongate region, for example forming a handle.

The cavity-defining portion can be configured to define the cavity in co-operation with at least one further cavity-defining portion in at least one further mold member. For example, the cavity-defining portion can be configured to define the cavity in co-operation with a complementary cavity-defining portion in one other mold member; in this case, the mold member and the one other mold member are mold halves (although it will be understood that the mold "halves" are not necessarily identical to each other).

The support portion can be wholly insoluble in the solvent. Alternatively the support portion can comprise a first region that is insoluble in the solvent and a second region that is soluble in the solvent. For example, the support portion can comprise a proximal region, adjacent to the cavity-defining portion, that is soluble in the solvent and a distal region, spaced apart from the cavity-defining portion, that is insoluble in the solvent.

The soluble material forming the cavity-defining portion can comprise at least one polymer or co-polymer, which can be a water-soluble polymer or co-polymer, for example a water soluble vinyl alcohol polymer or vinyl alcohol co-polymer. An example of a suitable soluble material is Nichigo G-POLYMER™ (Nippon Gohsei, Osaka, Japan).

The soluble material forming the cavity-defining portion can have one or more properties selected from the following:

it comprises a polymer, for example a vinyl alcohol polymer, having an average level of crystallinity of less than 35%, for example 10% to 30%;

it comprises a copolymer, for example a vinyl alcohol co-polymer, having an average level of crystallinity of less than 35%, for example 10% to 30%;

it comprises a vinyl alcohol copolymer that is not an ethylene-vinyl alcohol co-polymer;

it forms a surface of the cavity having a static sessile drop contact angle of less than 70 degrees (the surface can be free of a plasma treatment).

The present assignee's WO2012/013948 describes a mold assembly including a water-soluble mold member comprising at least one water soluble vinyl alcohol copolymer. The present assignee's WO2012/013944 describes a mold assembly including a water-soluble mold member comprising at least one vinyl alcohol polymer with high amorphous content and an average level of crystallinity of less than 35%. The present assignee's WO2012/013946 describes a mold assembly including a water-soluble mold member comprising at least one vinyl alcohol copolymer with high amorphous content and an average level of crystallinity from about 10% to about 30%. The present assignee's WO2012/013949 describes a mold assembly including a device-forming molding surface having a static sessile drop contact angle less than 70 degrees and which is free of a plasma treatment. The present assignee's WO2012/013947 describes a mold assembly including a mold member comprising at least one vinyl alcohol copolymer which is not an ethylene-vinyl alcohol co-polymer. The present assignee's WO2012/013945 describes two-part molding surface configured to cast mold an anterior or posterior surface of an ophthalmic device, the first part of the two-part molding surface being formed using at least one vinyl alcohol copolymer which is not an ethylene-vinyl alcohol copolymer. The entire contents of each of those documents is hereby incorporated into the present specification.

The solvent can be water.

The channel defined at least in part by the cavity-defining portion can be defined wholly or substantially wholly in the support portion. The channel defined at least in part by the cavity-defining portion can be defined in co-operation with at least one other mold member.

The channel defined at least in part by the support portion can be defined wholly or substantially wholly in the support portion. The channel defined at least in part by the cavity-defining portion can be defined in co-operation with at least one other mold member.

The channel defined at least in part by the cavity-defining portion and the channel defined at least in part by the support portion can form a continuous channel.

In an example mold member, the cavity-defining portion is circular or substantially circular and is soluble in water and is configured to define the cavity and the channel (which is circular or substantially circular and surrounds an optic-forming surface of the cavity) in co-operation with a complementary cavity-defining portion in a further mold member, and the support portion is an elongate handle and the support portion is configured to define the channel (which runs along a portion of the handle and is connected to the channel defined by the cavity-defining portion) in co-operation with a complementary channel-defining region in the further mold member.

The present disclosure is directed, in a second aspect, to a method of forming a contact lens, the method comprising:

providing a polymerizable contact lens precursor material in a cavity defined by at least one cavity-defining portion of at least one mold member, the cavity-defining portion comprising a material that is soluble in a solvent in which the contact lens is not soluble;

polymerizing the precursor material to form an unhydrated contact lens in the cavity; and holding a support portion of the mold member whilst immersing the cavity-defining portion in the solvent to dissolve at least part of the soluble material of the cavity-defining portion, so that the contact lens is released from the cavity;

wherein more of the precursor material is provided to the cavity than is required to fill the cavity, so that there is an excess of the precursor material, characterized in that the excess passes into a channel defined by at least one cavity-defining portion of at least one mold member; and a portion of the excess of the precursor material passes from said channel into a channel defined by at least one support portion of the at least one mold member, so that, after the precursor material is polymerized and the soluble material of the cavity-defining portion is dissolved, the excess precursor material forms a solid that is retained by the support portion.

The retention of the excess precursor material by the support portion may be assisted by gripping the mold at the channel defined by the support portion. The excess precursor material can then be retained even if the mold is completely submerged in the dissolving fluid; thus, when the mold member has completely dissolved, the flash remains held. The gripping may be between two grippers, which may for example each comprise a gripping head and a biasing member (e.g. a spring). The gripping head may have a rough distal surface, to ensure that the flash is held firmly.

The method may include the step of providing a receptacle under the mold member(s) for receiving the contact lenses as they are released from the cavity. The receptacle may include a plurality of recesses, each arranged to receive one released contact lens. Advantageously, such a lens capture tray can be part of an extraction and hydration step, avoiding an additional process step, in which the released contact lens(es) are picked out of the solvent and placed into a tray.

It may be that the cavity-defining portion is dissolved in two or more stages. It may be that, in an earlier stage, a lower part of the cavity-defining portion is immersed in the solvent and an upper part of the cavity-defining portion is not immersed in the solvent. It may be that in a later stage, the upper part of the cavity-defining portion is immersed in the solvent. By at least partially dissolving the lower part of the cavity-defining portion before beginning dissolution of the upper part of the cavity-defining portion, the risk is reduced that the lens will be partially released from the mold but retained by residual, undissolved soluble material in the lower part of the cavity-defining portion. Such retention can result in the lens "hinging" in the cavity-defining portion, and then, when finally fully released, falling to an undesirable location.

Ultrasound may be used to speed up dissolution of the mold.

The power of the ultrasound may be reduced during the dissolution. Thus, the dissolution may be initially carried out at a higher ultrasound power and then carried out at a lower ultrasound power. Thus, the mold is initially more rapidly dissolved, causing more agitation of the solvent, but is then less rapidly dissolved, causing less agitation of the solvent. By reducing the agitation of the solvent, the risk of the mold being deflected after it is released, so that it falls to an undesirable location, is reduced.

It has been found that ultrasound transducers can produce regions of ultrasound of higher intensity and regions of ultrasound of lower intensity, which can result in different dissolution rates for different mold positions. When a plurality of the mold members are being dissolved at the same time, the ultrasound transducer and the mold members may be moved relative to each other. That can smooth out the intensity variations, resulting in a reduction in the time required to release all of the lenses from the mold members. The ultrasound transducer may be moved whilst the mold members are held stationary (it can be advantageous to keep the mold members stationary, as if the mold member is moving when a lens is released the trajectory of the released lens as it falls can be hard to predict, making it difficult to catch the lens). Alternatively, the mold members may be moved whilst the ultrasound transducer is held stationary. Alternatively, both the mold members and the ultrasound transducers may be moved.

The movement may be in one dimension, i.e. a straight line. The movement may be in two dimensions, for example in a two-dimensional figure, e.g. a circle or a rectangle. The movement may be in three dimensions.

More generally, with or without the use of ultrasound, the mold may be moved during dissolution. For example, a plurality of the molds may be mounted on a moving support. For example, a plurality of the molds may be mounted around the circumference of a disc, the disc being rotated by a motor, so that the molds move around in a circle in the solvent. The mold may be moved continuously in the solvent throughout dissolution.

During the dissolution, the mold may be inside a guide tube. The guide tube may be arranged to direct the lens to a desired location, for example a receptacle. The guide tube may be made from an acoustically transparent material.

The solid formed by the polymerized excess precursor material can be a single piece or it can consist of several separate pieces.

The precursor material can be polymerized by any method capable of polymerizing the particular material used, for example by heating the material in an oven, or exposing the material to UV light.

Another aspect provides a method of forming a contact lens, the method comprising:
providing a polymerizable contact lens precursor material in a cavity defined by at least one cavity-defining portion of at least one mold member, the cavity-defining portion comprising a material that is soluble in a solvent in which the contact lens is not soluble;
polymerizing the precursor material to form an unhydrated contact lens in the cavity; and
immersing the cavity-defining portion in the solvent to dissolve at least part of the soluble material of the cavity-defining portion, so that the unhydrated contact lens is released from the cavity;
CHARACTERISED IN THAT the cavity-defining portion is dissolved in two or more stages.

It may be that, in an earlier stage, a lower part of the cavity-defining portion is immersed in the solvent and an upper part of the cavity-defining portion is not immersed in the solvent. It may be that in a later stage, the upper part of the cavity-defining portion is immersed in the solvent. By at least partially dissolving the lower part of the cavity-defining portion before beginning dissolution of the upper part of the cavity-defining portion, the risk is reduced that the lens will be partially released from the mold but retained by residual, undissolved soluble material in the lower part of the cavity-defining portion. Such retention can result in the lens "hinging" in the cavity-defining portion, and then, when finally fully released, falling to an undesirable location.

Another aspect provides a method of forming a contact lens, the method comprising:
providing a polymerizable contact lens precursor material in a cavity defined by at least one cavity-defining portion of at least one mold member, the cavity-defining portion comprising a material that is soluble in a solvent in which the contact lens is not soluble;
polymerizing the precursor material to form an unhydrated contact lens in the cavity; and
immersing the cavity-defining portion in the solvent to dissolve at least part of the soluble material of the cavity-defining portion, so that the unhydrated contact lens is released from the cavity;
CHARACTERISED IN THAT the solvent is agitated using ultrasound.

The power of the ultrasound may be reduced during the dissolution. The dissolution may be initially carried out at a higher ultrasound power and then carried out at a lower ultrasound power. Thus, the mold may be initially more rapidly dissolved, causing more agitation of the solvent, but may then be less rapidly dissolved, causing less agitation of the solvent. By reducing the agitation of the solvent, the risk of the mold being deflected after it is released, so that it falls to an undesirable location, is reduced.

The method may include dissolving a plurality of the mold members at the same time. The method may include moving the ultrasound transducer and the mold members relative to each other.

Another aspect provides a method of forming a contact lens, the method comprising:
providing a polymerizable contact lens precursor material in a cavity defined by at least one cavity-defining portion of at least one mold member, the cavity-defining portion comprising a material that is soluble in a solvent in which the contact lens is not soluble;
polymerizing the precursor material to form an unhydrated contact lens in the cavity; and
immersing the cavity-defining portion in the solvent to dissolve at least part of the soluble material of the cavity-defining portion, so that the unhydrated contact lens is released from the cavity;
CHARACTERISED IN THAT the mold is moved during dissolution.

A plurality of the molds may be mounted on a moving support. For example, a plurality of the molds may be mounted around the circumference of a disc, the disc being rotated by a motor, so that the molds move around in a circle in the solvent.

The mold may be moved continuously throughout dissolution.

Another aspect provides a method of forming a contact lens, the method comprising:
providing a polymerizable contact lens precursor material in a cavity defined by at least one cavity-defining portion of at least one mold member, the cavity-defining portion comprising a material that is soluble in a solvent in which the contact lens is not soluble;
polymerizing the precursor material to form an unhydrated contact lens in the cavity; and
immersing the cavity-defining portion in the solvent to dissolve at least part of the soluble material of the cavity-defining portion, so that the unhydrated contact lens is released from the cavity;
CHARACTERISED IN THAT the mold is inside a guide tube during the dissolution, the guide tube being arranged to direct the lens to a desired location when the lens is released from the cavity.

The guide tube may be cylindrical. The guide tube may be of circular cross-section.

The guide tube may extend from the surface of the solvent to the desired location.

The desired location may be a compartment in a lens-carrying tray.

The mold may be inside the guide tube throughout the dissolution.

The guide tube may be made from an acoustically transparent material. The acoustically transparent material may be a polymeric material. The polymeric material may comprise a repeat unit that is derivable from an alkene having 3 to 10, preferably 4 to 8, carbon atoms. The alkene may be branched or unbranched. Preferably, the alkene has an alkyl side chain. The alkyl side chain may have 1 to 4, preferably 1 or 2, more preferably 1, carbon atoms. The alkene can optionally be interrupted or substituted by an atom or moiety that does not interfere with the desired properties of the material, for example its acoustic transparency.

For example, the material may be polymethylpentene, with an exemplary repeat unit being one derived from 4-methyl-1-pentene.

Another aspect provides an apparatus for releasing a contact lens from a cavity-defining portion of a mold member, the apparatus comprising:

a holder arranged to hold a support portion of a soluble mold member whilst immersing a cavity-defining portion of the mold member in a solvent to dissolve at least part of the cavity-defining portion and thereby release the contact lens;

CHARACTERISED IN THAT the apparatus includes a guide tube arranged at least partially in the solvent and the holder is arranged to hold the mold member inside the guide tube during the dissolution, the guide tube being arranged to direct the lens to a desired location when the lens is released from the cavity-defining portion of the mold member.

Figure 1B:
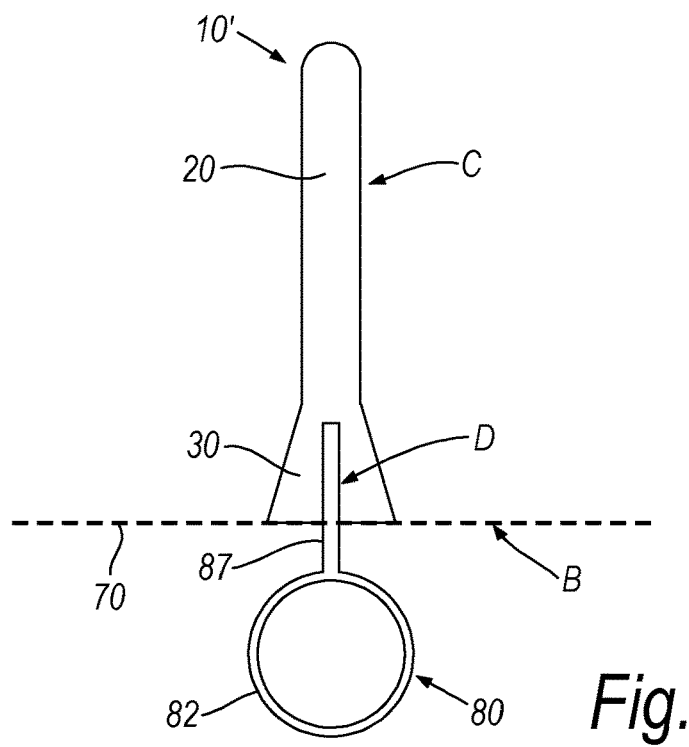

With reference to the drawings, FIGS. 1A and 1B show schematically an example embodiment of the contemplated approaches. A mold member 10 (FIG. 1A), for use in forming a contact lens, comprises a cavity-defining portion 40 and a support portion comprising a handle 20 and a taper 30. A ring-shaped channel 50 is defined in the cavity-defining portion 40. The ring-shaped channel 50 in the cavity-defining portion 40 is in fluid communication with a linear channel 60 defined in the taper 30.

The mold member 10 is formed of Nichigo G-POLY-MER™, a material that is soluble in water. In one embodiment, the contact lens to be formed using the mold member is made from a silicone hydrogel, which is not soluble in water. The mold member 10 is combined with a complementary mold member (not shown) to form a mold pair. The cavity-defining portion 40 and a complementary cavity-defining portion in the complementary mold member define a cavity in the mold pair. Again, it is to be recognized that other approaches to molds are contemplated, including unitary mold structures. The complementary mold member is also formed of the soluble material, but in this example does not have the channels 50, 60. Prior to bringing together the mold member 10 and the complementary mold member, the cavity-defining portion 40 of the mold member 10 is filled with a contact-lens precursor material in the manner well-known in the art. The volume of precursor material that is provided to the cavity-defining portion 40 is slightly larger than the volume required to form a contact lens. That is because it is better to slightly over-fill than to slightly under-fill the cavity-defining portion 40, as under-filling would result in a void in the contact lens, which would render it useless. Overfilling results in an excess of the contact lens precursor material. When the complementary mold member is brought together with the mold member 10 to form the mold pair, excess of the precursor material is forced into the ring-shaped channel 50 and the linear channel 60. The contact-lens precursor material is cured, in the manner well-known in the art. The mold pair is then partially immersed in the solvent, so that the cavity-defining portions 40 are wholly immersed in the solvent and the tapers 30 and handles 20 are not immersed in the solvent. The mold pair is left immersed in that manner until the cavity-defining portions 40 have fully dissolved. The contact lens formed in the cavity-defining portion 40 is then free to float away from the mold pair remains 10'. The mold pair remains 10' (FIG. 1B) include the handles 20 and the tapers 30, and also flash 80. The flash 80 is formed of cured excess precursor material that had flowed into the ring-shaped channel 50 and the linear channel 60. The flash 80 therefore has the form of a ring 82, formed in the ring-shaped channel 50, and a stem 87, formed in the linear channel 60. The stem 87 is firmly held in the taper 30 and the ring 82, which is integral with the stem 87, is thereby also retained by the taper 30. Thus the flash 80 is retained in the mold pair remains 10', keeping it separate from the freed contact lens.

Figure 2:
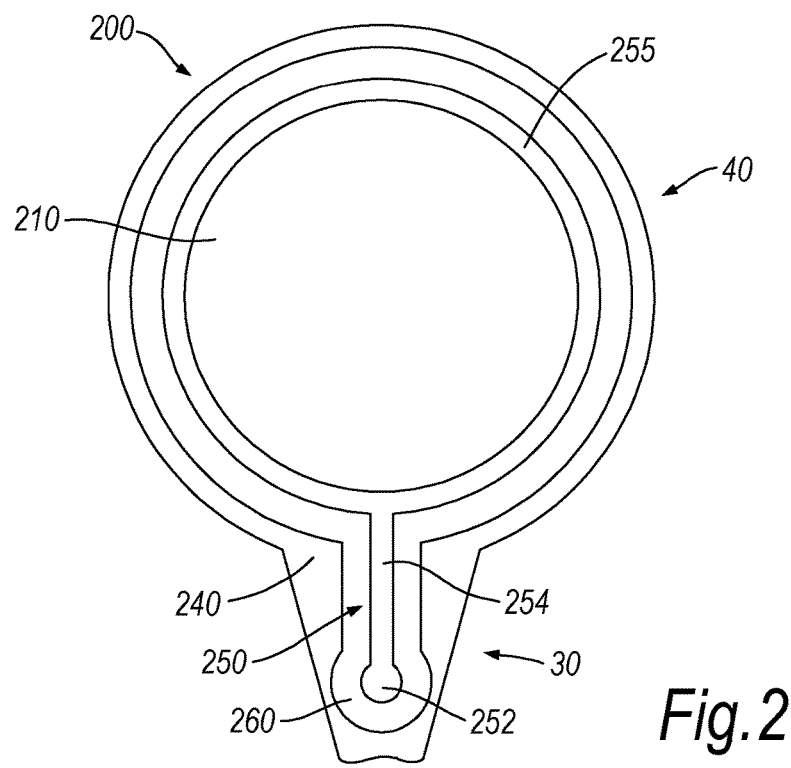
FIG. 2 is a plan view of a mold member according to another example embodiment of the disclosure.

The cavity-defining portion 40 and taper 30 of another example mold member 200 is shown in FIG. 2. The mold member 200 includes a central lens-defining region 210, which defines a cavity in which a contact lens is formed using the mold member 200. The lens-defining region 210 is surrounded by a ring-shaped channel 255 and there is further provided a linear channel 250 extending therefrom, for receiving excess monomer in the manner described above with regard to ring-shaped channel 50 and linear channel 60. The linear channel 250 and the ring-shaped channel 255 are surrounded by an outer wall 260, which acts to retain excess monomer in the linear channel 250 and the ring-shaped channel 255, and provides an area in which fusion of the mold member 200 with a complementary mold member can take place. The wall 260 is surrounded by an outermost portion 240, defining the taper 30 and the outermost periphery of the cavity-defining portion 40. In this example, the linear channel 250 comprises a linear portion 254 and an enlarged circular end portion 252; however, it is to be recognized that the enlarged circular end portion can be omitted.

Figure 4:
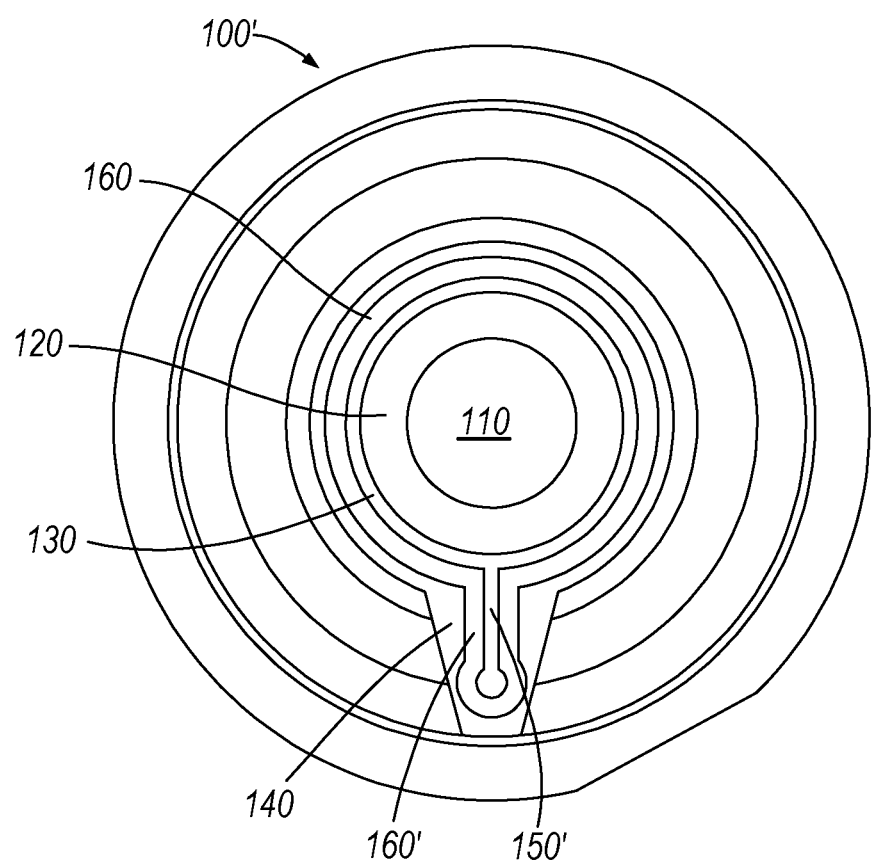
FIG. 4 is a plan view of another mold half for use in manufacturing mold members according to another example embodiment of the disclosure.

The mold member 200 is made by injection molding the soluble material into a pair of re-usable molds. The re-usable mold 100' defining the front of the mold member 10 is shown in FIG. 4; the complementary re-usable mold, defining the rear of the mold member 10, is of straightforward design and is not illustrated. The re-usable mold 100' includes a plurality of regions, which define corresponding regions in the mold member 200. At the centre of the re-usable mold 100' is a hole 110 for receiving an insert (not shown) that defines the lens-defining region 210 (See also FIG. 2) of the mold member 200. The hole 110 is surrounded by a peripheral region 120, against which the insert sits.

The peripheral region 120 is surrounded by an annular ridge 130, which is contiguous with an elongate linear ridge 150' extending from the side of the annular ridge 130. The annular ridge 130 and elongate linear ridge 150' define, respectively, the ring-shaped channel 255 and the linear channel 250 in the mold member 200. The annular ridge 130 and elongate linear ridge 150' are surrounded by an outer channel 160', which defines an outer wall 260 in the mold member 200. The outer channel 160' is surrounded by an outer region 140, which defines the taper 30 and the outermost periphery of the mold member 200.

In the manufacture of a mold member 200, the re-usable mold 100' is mounted in an injection molding machine (not shown). The polymer injection point is a short distance from the re-usable mold 100', and the injected polymer passes from the injection point to the re-usable mold 100' along a channel in fluid communication with the part of the outer region 140 that defines the taper 30. When the re-usable mold 100' is full of polymer, it backs up along the channel and, on cooling, forms the handle 20 (See FIGS. 1A & 1B of the mold member 200 (FIG. 2).

Figure 3:
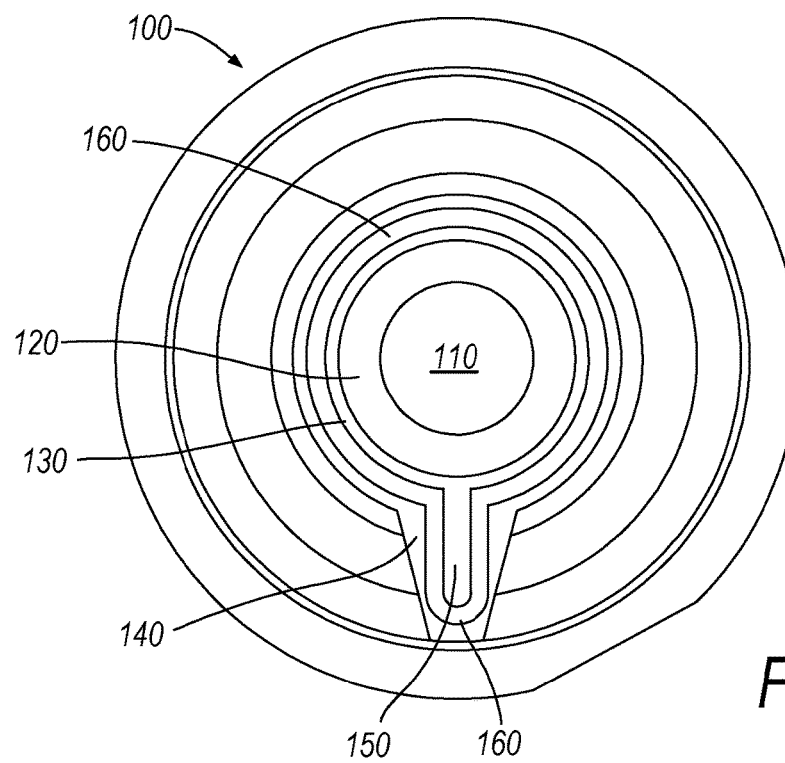
FIG. 3 is a plan view of a mold half for use in manufacturing mold members according to an example embodiment of the disclosure.

FIG. 3 shows a re-usable mold 100 that is identical to re-usable mold 100', save that the linear channel 150 is of simple linear form, and consequently so is the corresponding part of the surrounding channel 160.

Figure 5:
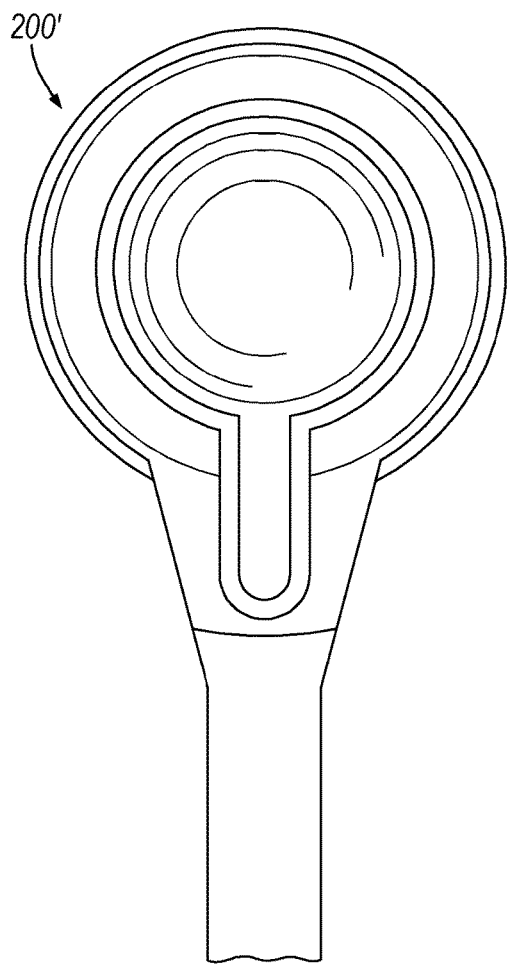
FIG. 5 is a mold member according to an example embodiment of the disclosure.
Figure 6:
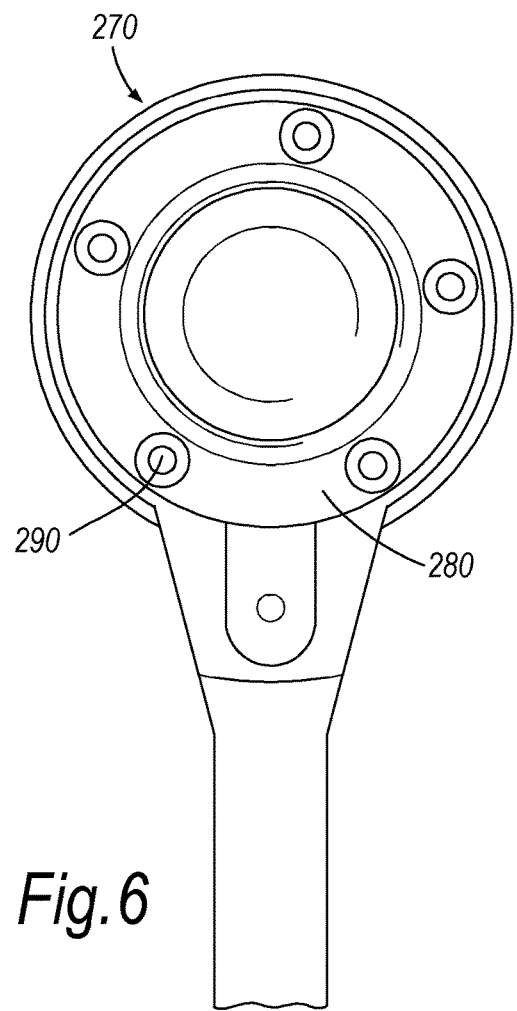
FIG. 6 is the mold member of FIG. 5 assembled with a second, complementary, mold member to form a mold pair, the mold pair containing a lens formed by curing monomer within the pair.

A mold of the kind shown in FIG. 3 was machined from high-chrome tool steel. A front mold member 200' (FIG. 5) according to an example embodiment was formed by injection-molding using the mold and a complementary rear mold (not shown). The front mold member 200' is contemplated to be made of a soluble material. The front mold member 200' thus formed was then filled with monomer. The cavity-forming region 40 is overfilled, so that the monomer fills not only the central lens-defining region 210', but excess monomer passes also into the ring-shaped channel 255' and the linear channel 250'. A rear mold member 280 can be placed on top of the front mold member 200' to form a mold pair 270 (FIG. 6). The front mold member 200' and the rear mold member 280 can be fused together by insertion of hot stakes at five equally spaced points about the periphery of the mold members 200', 280, forming fusion regions 290. The monomer within the mold pair 270 can then be cured.

In this example, it is contemplated that one hundred sixteen of the mold pairs 270 containing cured monomer can be placed in a support 300 (FIG. 7). Of course in various other approaches, fewer or more mold pairs can be placed in a support. Accordingly, the support 300 can comprise four support bars 310 arranged in parallel and joined together at their ends by crosspieces 330. Each bar 310 can include two elongate blocks of rubber 320, running along the length of the bar 310. The two elongate blocks define a slit between them, running along the length of the bar 310. The handle 20 of each mold pair 270 is received in the slit and thereby gripped by the rubber blocks 320. In this example, twenty-nine mold pairs 270 were equally spaced along the length of each of the four support bars 30, but again, the apparatus can be adapted to accept fewer or more mold pairs.

The support 300 can be used in conjunction with a table. An example table 400 (FIG. 8) is formed of four legs 410 and three frame struts 420, the latter defining three sides of a rectangle, with a leg 410 at each corner. The fourth side of the table 400 is defined by a further frame strut 430, which is raised above the plane of the rectangle (the two legs on that side of the rectangle being longer than the other two, and extending above the plane of the rectangle). The further frame strut 430 carries five spray nozzles 440 arranged along its length. The spray nozzles cooperate with the support and other structure to circulate fluid, such as water, to increase flow and optimize the efficiency and effectiveness of the dissolving procedure. For example, a flow rate for each nozzle can be up to 1 l/min or more.

The three frame struts 420 support a poly carbon plate 450. The plate includes a plurality of holes 460, arranged in a regular grid. In this example the holes are arranged in a 4×8 grid, providing 32 holes; the table used in conjunction with support 300 would of course have one hundred sixteen (or more) holes.

The table 400 is positioned over a tank (not shown).

Figure 9A:
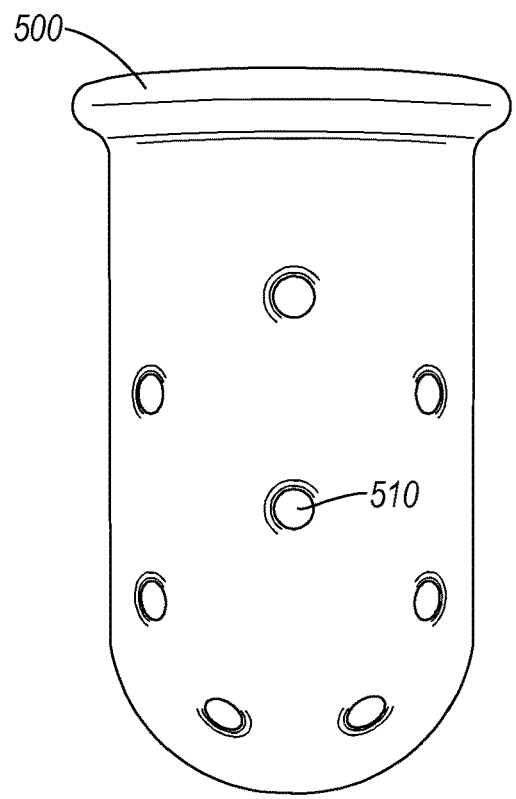
FIG. 9A is a side view and FIG. 9B is a top view of a perforated vial for mounting in the table.
Figure 9B:
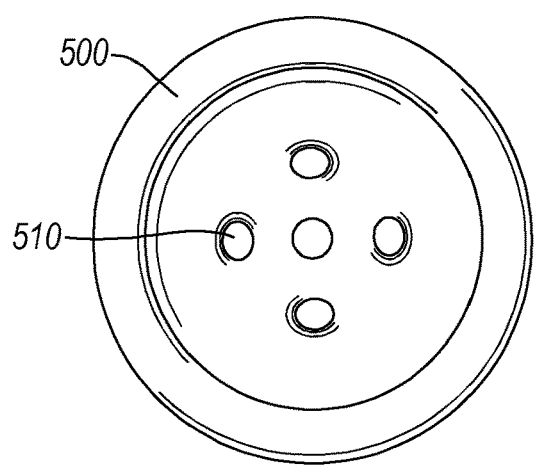

Each hole 460 is associated with a glass vial 500 (FIGS. 9A & 9B). The glass vials 500 each has a plurality of holes 510 in the side and base of the glass, enabling liquid to enter and leave the vial. Glass can be employed as the vial material to facilitate the transference of ultrasonic energy to the mold to be dissolved. In one approach, the vials are contemplated to be formed from Pyrex glass.

Figure 10A:
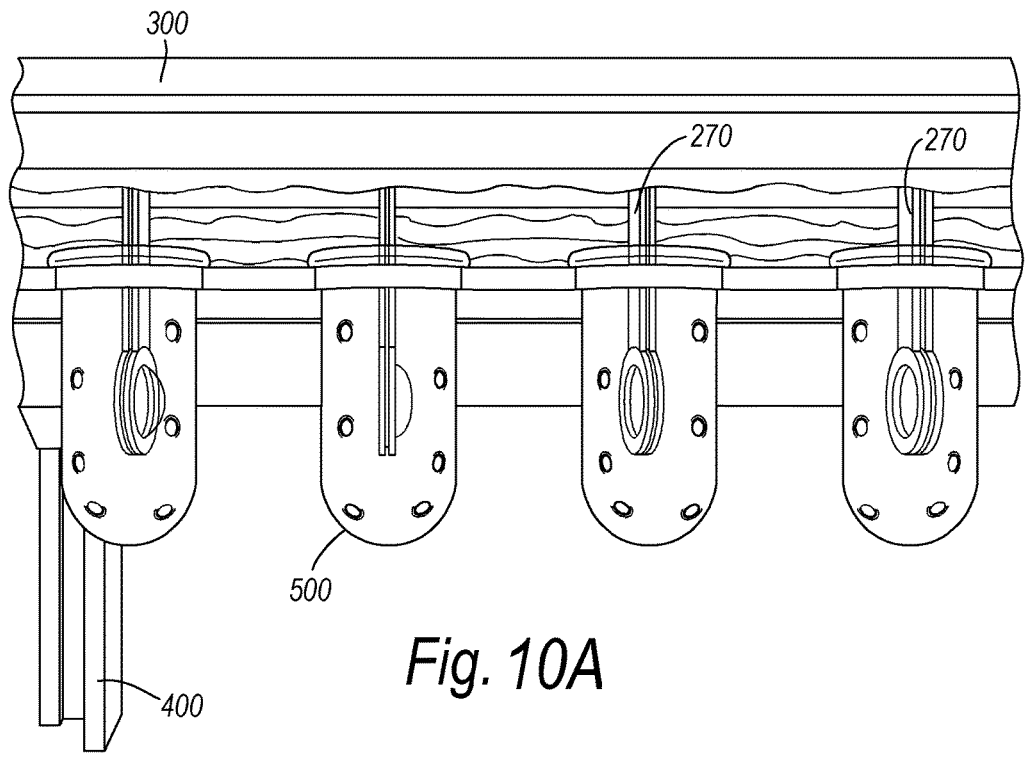
FIG. 10A is a side view of the table assembled with rack, mold pairs, and perforated vials.
Figure 10B:
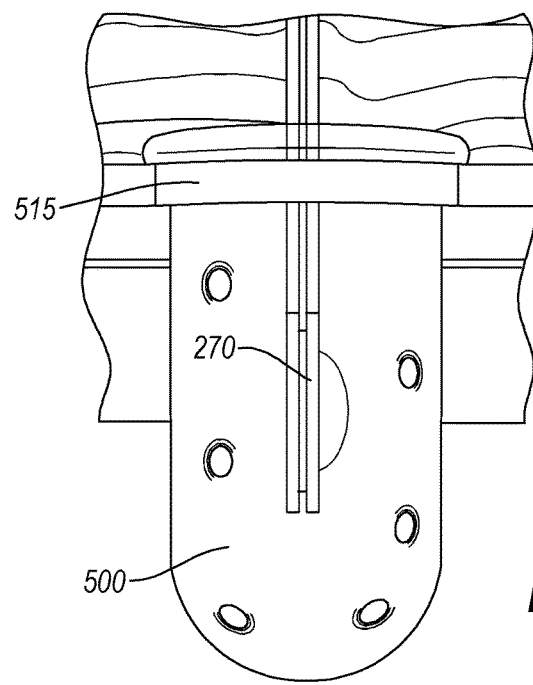
FIG. 10B is a close-up of part of FIG. 10A.

In use, the vials 500 are supported in the table 400 in a metal support band 515, each vial 500 being positioned directly beneath a hole 460 in the plate 450 (See FIGS. 10A & 10B and also FIG. 8). The support 300 is placed on top of the plate 450. The mold pairs 270 protrude downwards through the holes 460 and into the vials 500 (FIGS. 10A & 10B), so that each vial 500 surrounds the cavity defining portion, 40, taper 30 and the majority of the handle 20 (FIG. 1A) of the mold pair 270 (FIG. 6).

The tank (not shown) is filled with water from the nozzles 440 (FIG. 8), until the vials fill to a level at which the cavity-defining portion 40 of the mold pairs 270 (FIG. 6) is submerged in the water, but the taper 30 of the mold pairs 270 is above the level of the water.

Figure 11A:
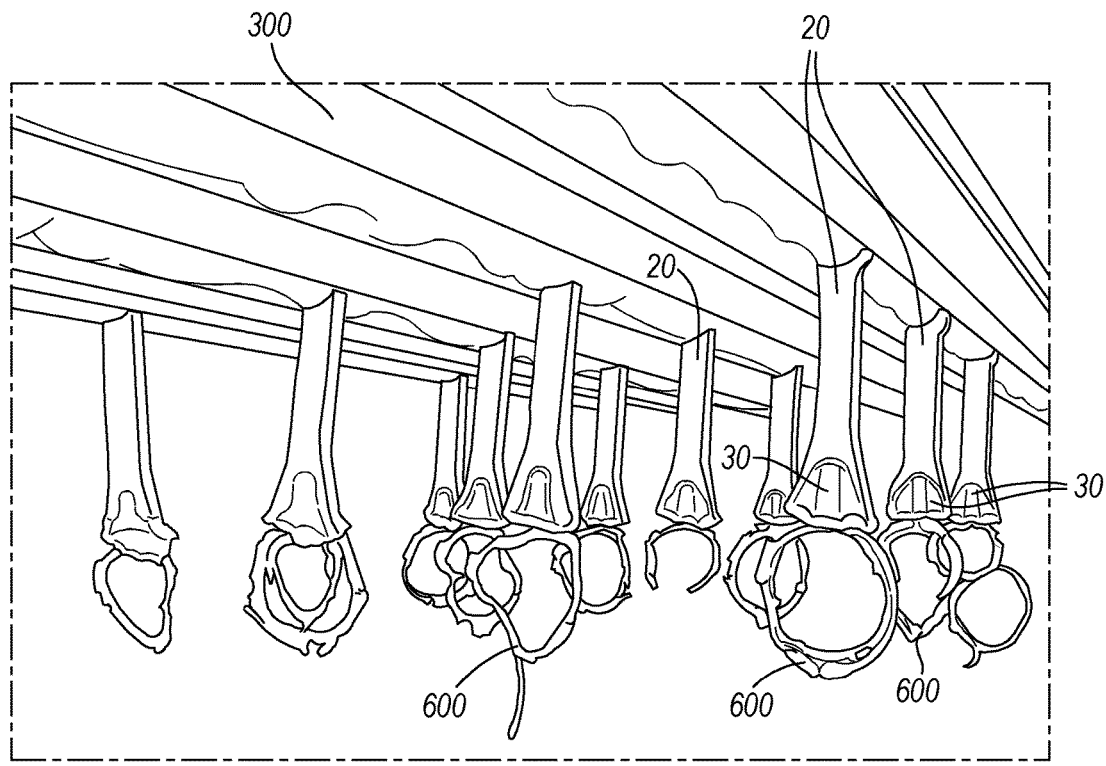
FIG. 11A is a rack holding mold pairs after partial immersion in a solvent and FIG. 11B is a close-up of part of FIG. 11A.
Figure 11B:
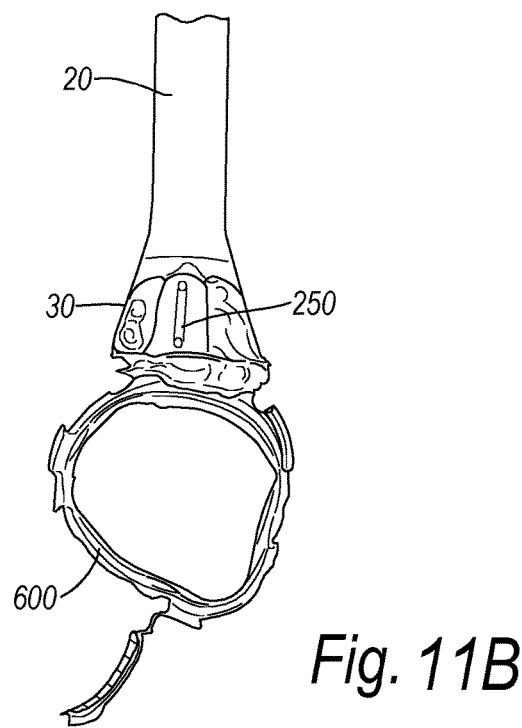

The water in the vial 500 (for example see FIGS. 10A & 10B) in contact with the cavity-defining portion 40 (FIG. 6) dissolves the soluble material of the cavity-defining portion, and hence the cavity-defining portion itself (See FIGS. 11A & 11B).

Once the cavity-defining portion of both mold members forming the mold pair 270 is dissolved, the contact lens, formed by the curing of the monomer in the cavity-defining portion 40, is free to float away from the remains of the mold pair. The freed contact lens is retained in the vial 500.

The excess monomer that passes into the ring-shaped channel 255 and the linear channel 250 (See FIG. 2) is polymerized in the curing process, and forms a single piece of flash 600 in each mold pair (See FIGS. 11A & 11B). When the cavity-defining portion is dissolved, the portion of the flash 600 in the ring-shaped channel 255 is left exposed in the water, but it is attached to the remainder of the flash, which is formed in the linear channel 250. The linear channel 250 extends into the taper 30 of the mold pair 270 (FIG. 6). As the taper 30 is not submerged in the water, it does not dissolve. Consequently, the flash in the linear channel 250' (FIG. 5) is held firmly in the taper 30, which is in turn supported by the handle 20, which is held in the support 300 (FIGS. 10A & 10B). Moreover, the exposed portion of the flash 600, the portion formed in the ring-shaped channel, is thereby also retained by the taper 30 (FIGS. 11A & 11B). Consequently, the support 300 can be removed from the table 400 (FIG. 8), taking the flash 600 with it, whilst leaving the formed contact lenses in the vials 500.

Figure 12:
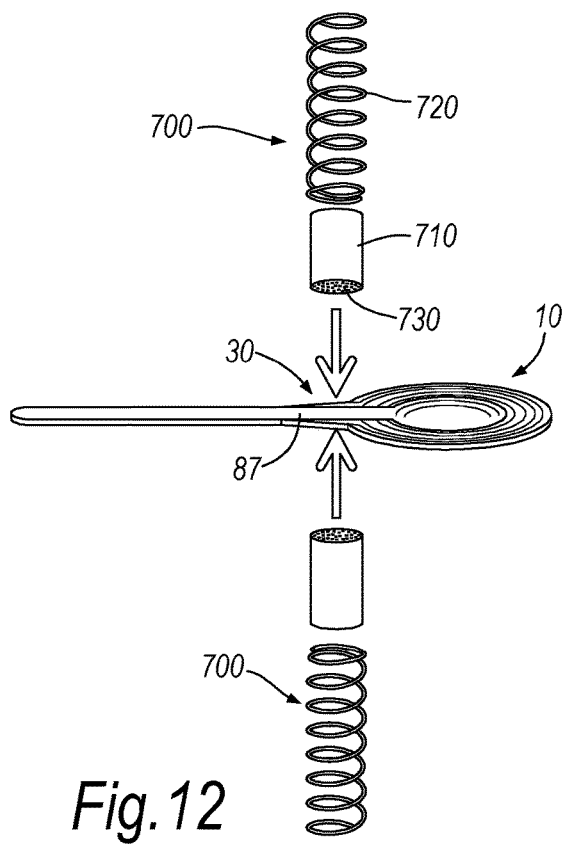
FIG. 12 is a schematic illustration of an example embodiment of another aspect of the invention.

In some processes embodying the invention there may be a risk that too much of the taper 30 (or other portion of the mold retaining the flash stem) is itself dissolved, so that the flash stem 87 is not properly retained. It is envisaged that in such processes the retention is enhanced by gripping the mold at the point of the flash retention, i.e. at the taper 30 in the example mold 10 described above. The flash 80 can then be retained even if completely submerged in the dissolving fluid (and also regardless of orientation). In the example arrangement of FIG. 12, the flash is retained by gripping the taper 30 between two grippers 700. The grippers 700 comprise a gripping head 710 and a biasing member, in this example in the form of a spring 720. The gripping head 10 has a rough distal surface 730, to ensure that the flash 80 is held firmly. As the mold 10 is dissolved, the grippers 700 maintain pressure on the flash stem 87. When the mold 10 has completely dissolved, the flash 80 remains held between the rough distal surfaces 730 of the grippers 700.

Figure 13:
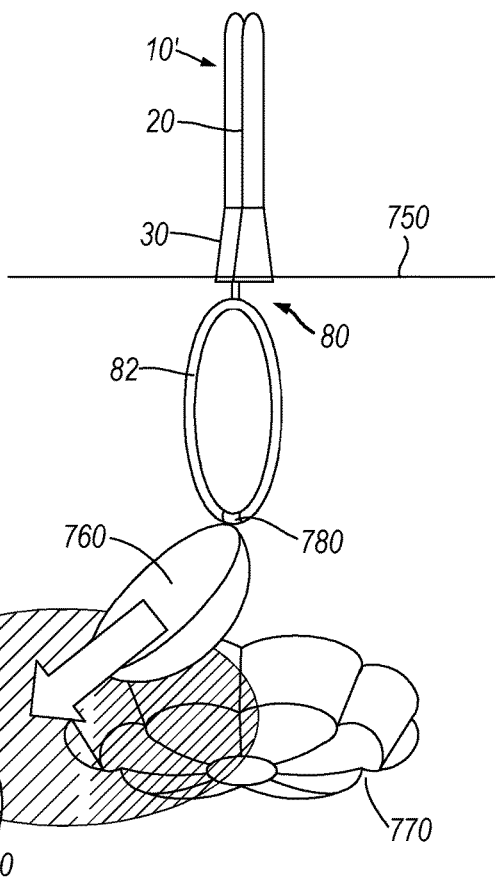
FIG. 13 is a schematic illustration of a problem arising with a lens "hinging" in a partially dissolved mold.

The inventors have found that, in practice, different regions of the contact lens mold 10 can take different times to dissolve. For example, if the lower end of the mold 10 (furthest away from the handle 20) dissolves only after other lens-retaining regions dissolve (FIG. 13), a region 780 of the mold material can act as a hinge, interfering with the falling of the lens 760 from the flash ring 82. In embodiments that do not employ the glass vials 500, or another receptacle arranged to inevitably catch the falling lens, the hinge 780 can result in a change in the potential "drop zone" 790 of the lens 760. If the lens 760 is arranged to fall into a tray pocket 770, for example, the "hinging" can cause the lens 760 to miss the pocket 770 and float away.

Figure 14:
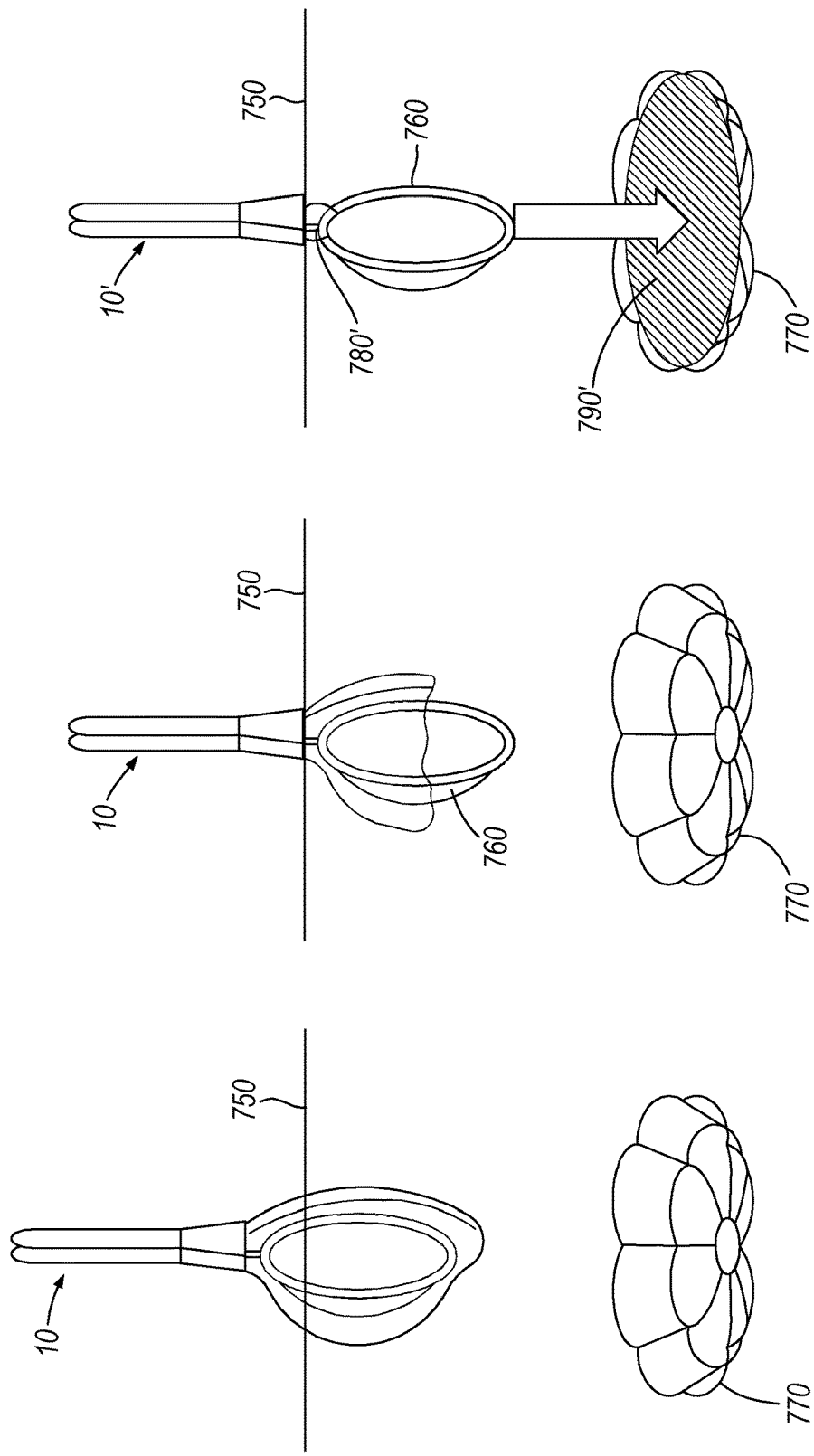
FIG. 14 is a schematic illustration of three steps of an example method according to another aspect of the invention, addressing the problem shown in FIG. 13.

In order to prevent the residual region 780 of mold material occurring (FIG. 14), the lower end of the mold 10 can be given a "head-start" in the dissolution process, by initially holding the mold 10 so that the upper part of the cavity-defining portion 40 is above the water level 750 (FIG. 14, step 1). After a period of time, the portion of the mold 10 below the water level 750 will have at least partially dissolved, and the mold 10 is then fully immersed below the water level 750 (FIG. 14, step 2) and the dissolution completed. That helps to ensure that the mold 10 dissolves from the bottom-up, with the portion 780' of the mold material that dissolves last being above the center of gravity of the lens 760, so that the "hinging" issue is negated, and resulting in the potential drop zone 790' being more accurately aligned with the tray pocket 770 (FIG. 14, step 3).

While the present disclosure has been described and illustrated with reference to particular embodiments, it will be appreciated by those of ordinary skill in the art that the disclosure lends itself to many different variations not specifically illustrated herein.

For example, ultrasound can be used to speed up dissolution of the mold. If ultrasound is used, it can agitate the solvent, which can affect the likely drop zone of the lens when released. In order to reduce the risk of the contact lens being "blown" off-course, away from the target tray pocket in the retaining tray, the power of the ultrasonic agitation can be reduced during the dissolution. For example, the dissolution can be initially carried out at a higher ultrasound power, in order to initially rapidly dissolve the mold. As the mold dissolves and the lens is about to drop from the mold, the ultrasonic power can be reduced to a lower ultrasound power, in order to reduce the agitation that might cause the contact lens to miss the tray pocket; for example, the first half of the time required to dissolve the mold can be carried out at full ultrasonic power, and the second half carried out at half ultrasonic power.

An alternative or additional way to reduce the risk of the contact lens being "blown" off course by the ultrasound is to place the dissolvable mold inside an acoustically transparent guide tube (for example made from a polymeric material, for example polymethylpentene), arranged to direct the lens to a desired location.

Dissolution of the mold can be speeded up by mechanical movement of the mold in the solvent. For example, in some embodiments, molds are mounted on a moving support, for example around the circumference of a disc, the disc being rotated by a motor, so that the molds move around a circle in the solvent.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A method of forming a contact lens, the method comprising:
providing a polymerizable contact lens precursor material in a cavity defined by at least one cavity-defining portion of at least one mold member, the at least one cavity-defining portion comprising a material that is soluble in a solvent in which the contact lens is not soluble;
polymerizing the polymerizable contact lens precursor material to form an unhydrated contact lens in the cavity; and
holding a support portion of the at least one mold member whilst immersing the at least one cavity-defining portion in the solvent to dissolve at least part of the material that is soluble of the at least one cavity-defining portion, so that the contact lens is released from the cavity;
wherein more of the polymerizable contact lens precursor material is provided to the cavity than is required to fill the cavity, so that there is an excess of the polymerizable contact lens precursor material;
wherein,
the excess of the polymerizable contact lens precursor material passes into a channel defined by at least one cavity-defining portion of at least one mold member; and
a portion of the excess of the polymerizable contact lens precursor material passes from said channel into a channel defined by the support portion of the at least one mold member, so that, after the polymerizable contact lens precursor material is polymerized and the material that is soluble of the at least one cavity-defining portion is dissolved, the excess polymerizable contact lens precursor material forms a solid that is retained by the support portion.

2. A method as claimed in claim 1, in which the retention of the excess polymerizable contact lens precursor material by the support portion is assisted by gripping the at least one mold member at the channel defined by the support portion.

3. A method as claimed in claim 1, in which the at least one cavity-defining portion is dissolved in two or more stages.

4. A method as claimed in claim 3, in which, in an earlier stage, a lower part of the at least one cavity-defining portion is immersed in the solvent and an upper part of the at least one cavity-defining portion is not immersed in the solvent and, in a later stage, the upper part of the at least one cavity-defining portion is immersed in the solvent.

5. A method as claimed in claim 1, wherein ultrasound is used to speed up dissolution of the at least one mold member.

6. A method as claimed in claim 5, in which the ultrasound is reduced in power during the dissolution.

7. A method as claimed in claim 1, in which the at least one mold member is moved in the solvent continuously during dissolution.

8. A method as claimed in claim 1, wherein the at least one mold member comprises a plurality of molds that are mounted on a moving support.

9. A method as claimed in claim 1, in which, during dissolution, the at least one mold member is inside a guide tube.

10. A method as claimed in claim 9, wherein the guide tube is made from an acoustically transparent material.

11. A method as claimed in claim 1, in which the solid formed by the solid that is retained by the at least one support portion is in a single piece.

* * * * *